(12) United States Patent
Budagavi

(10) Patent No.: US 11,122,262 B2
(45) Date of Patent: Sep. 14, 2021

(54) SYSTEM AND METHOD FOR MOTION COMPENSATION IN VIDEO CODING

(71) Applicant: Samsung Electronics Co., Ltd., Suwon-si (KR)

(72) Inventor: Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 14/750,885

(22) Filed: Jun. 25, 2015

(65) Prior Publication Data

US 2015/0382005 A1  Dec. 31, 2015

Related U.S. Application Data

(60) Provisional application No. 62/018,296, filed on Jun. 27, 2014, provisional application No. 62/080,068, filed on Nov. 14, 2014.

(51) Int. Cl.
*H04N 11/02* (2006.01)
*H04N 19/117* (2014.01)
(Continued)

(52) U.S. Cl.
CPC ......... *H04N 19/117* (2014.11); *H04N 19/159* (2014.11); *H04N 19/70* (2014.11);
(Continued)

(58) Field of Classification Search
CPC .... H04N 19/159; H04N 19/117; H04N 19/59; H04N 19/146; H04N 19/70; H04N 19/82; H04N 19/85
(Continued)

(56) References Cited

U.S. PATENT DOCUMENTS 5,852,470 A * 12/1998 Kondo ................ H04N 7/0125
348/448
5,920,654 A * 7/1999 Someya ................ G06T 3/4007
348/E5.076

(Continued)

FOREIGN PATENT DOCUMENTS

EP     2262267 A1    12/2010

OTHER PUBLICATIONS

Y. Vatis et al. "Motion-and aliasing-compensated prediction using a two-dimensional non-separable adaptive Wiener interpolation filter," IEEE International Conference on Image Processing, ICIP 2005, vol. 2, Sep. 11-14, 2005, 6 pages.
(Continued)

*Primary Examiner* — Jayanti K Patel
*Assistant Examiner* — Richard B Carter

(57) ABSTRACT

A method and user equipment for decoding a bitstream of video. The user equipment includes a transceiver and a decoder. The transceiver is configured to receive an encoded bitstream of video including a pixel block. The decoder includes processing circuitry configured to select, from among a plurality of vertical interpolation filters, one of a vertical one-dimensional filter and a vertical two-dimensional filter. The processing circuitry is also configured to select, from among a plurality of horizontal interpolation filters, one of a horizontal one-dimensional filter and a horizontal two-dimensional filter. The processing circuitry is also configured to use the selected vertical and horizontal interpolation filters to generate at least one pixel value by interpolating pixels of the pixel block. The processing circuitry is also configured to perform prediction decoding using the at least one pixel value to restore the video.

18 Claims, 13 Drawing Sheets

(51) Int. Cl.
*H04N 19/159* (2014.01)
*H04N 19/70* (2014.01)
*H04N 19/82* (2014.01)
*H04N 19/85* (2014.01)
*H04N 19/146* (2014.01)
*H04N 19/59* (2014.01)

(52) U.S. Cl.
CPC ............ *H04N 19/82* (2014.11); *H04N 19/85* (2014.11); *H04N 19/146* (2014.11); *H04N 19/59* (2014.11)

(58) Field of Classification Search
USPC .......... 375/240.12, 240.22, 240.25; 382/166; 348/493, 451, 663
See application file for complete search history.

(56) References Cited

U.S. PATENT DOCUMENTS

| | | | | |
|---|---|---|---|---|
| 6,072,830 | A * | 6/2000 | Proctor | G06T 9/008 375/240.22 |
| 2006/0044473 | A1* | 3/2006 | Lin | H04N 9/78 348/663 |
| 2009/0257493 | A1* | 10/2009 | Ye | H04N 7/364 375/240.12 |
| 2009/0274216 | A1 | 11/2009 | Kato et al. | |
| 2010/0135398 | A1 | 6/2010 | Wittmann et al. | |
| 2010/0316291 | A1* | 12/2010 | Deng | G06K 7/10544 382/166 |
| 2011/0249737 | A1 | 10/2011 | Joshi et al. | |
| 2012/0134425 | A1* | 5/2012 | Kossentini | H04N 19/117 375/240.25 |
| 2012/0230407 | A1 | 9/2012 | Minoo et al. | |

OTHER PUBLICATIONS

International Search Report, dated Sep. 30, 2015, in connection with PCT/KR2015/006642, 3 pages.
Written Opinion of the International Searching Authority, dated Sep. 30, 2015, in connection with PCT/KR2015/006642, 7 pages.
Extended European Search Report regarding Application No. 15812037.8, dated Jan. 18, 2018, 11 pages.
Tourapis et al., "A Frame Compatible System for 3D Delivery", ISO/IEC JTC1/SC291WG11 MPEG2010/M17926, Jul. 2010, 62 pages.
Kossentini et al., "An Adaptive Interpolation Filtering Technique", Joint Collaborative Team on Video Coding (JCT-VC) of ITU-T SG16 WP3 and ISO/IEC JTC1/SC29/WG11, Document JCTVC-F216, Jul. 2011, 26 pages.
LV et al., "A comparison of fractional-pel interpolation filters in HEVC and H.264/AVC", IEEE Visual Communications and Image Processing (VCIP), Nov. 2012, 6 pages.
Wang et al., "RFM2.0 for internet video coding", ISO/IEC JTC1/SC29/WG11 MPEG2012/M26716, Oct. 2012, 25 pages.
Ugur et. al., "Motion Compensated Prediction and Interpolation Filter Design in H.265/HEVC," IEEE Journal of Selected Topics in Signal Processing, vol. 7, No. 6, Dec. 2013, pp. 946-956.
Vatis et al., "Adaptive Interpolation Filter for H.264/AVC," IEEE Transactions on Circuits and Systems for Video Technology, vol. 19, No. 2, Feb. 2009, pp. 179-192.
European Patent Office, "Communication pursuant to Article 94(3) EPC," Application No. EP15812037.8, dated May 22, 2019, 5 pages.
European Patent Office, Communication pursuant to Article 94(3) EPC regarding Application No. 15812037.8, dated May 27, 2021, 8 pages.

* cited by examiner

| $A_{-1,-1}$ | | | | $A_{0,-1}$ | $a_{0,-1}$ | $b_{0,-1}$ | $c_{0,-1}$ | $A_{1,-1}$ | | | | $A_{2,-1}$ |
|---|---|---|---|---|---|---|---|---|---|---|---|---|
| | | | | | | | | | | | | |
| | | | | | | | | | | | | |
| | | | | | | | | | | | | |
| $A_{-1,0}$ | | | | $A_{0,0}$ | $a_{0,0}$ | $b_{0,0}$ | $c_{0,0}$ | $A_{1,0}$ | | | | $A_{2,0}$ |
| $d_{-1,0}$ | | | | $d_{0,0}$ | $e_{0,0}$ | $f_{0,0}$ | $g_{0,0}$ | $d_{1,0}$ | | | | $d_{2,0}$ |
| $h_{-1,0}$ | | | | $h_{0,0}$ | $i_{0,0}$ | $j_{0,0}$ | $k_{0,0}$ | $h_{1,0}$ | | | | $h_{2,0}$ |
| $n_{-1,0}$ | | | | $n_{0,0}$ | $p_{0,0}$ | $q_{0,0}$ | $r_{0,0}$ | $n_{1,0}$ | | | | $n_{2,0}$ |
| $A_{-1,1}$ | | | | $A_{0,1}$ | $a_{0,1}$ | $b_{0,1}$ | $c_{0,1}$ | $A_{1,1}$ | | | | $A_{2,1}$ |
| | | | | | | | | | | | | |
| | | | | | | | | | | | | |
| | | | | | | | | | | | | |
| $A_{-1,2}$ | | | | $A_{0,2}$ | $a_{0,2}$ | $b_{0,2}$ | $c_{0,2}$ | $A_{1,2}$ | | | | $A_{2,2}$ |

2DHV filter for
horizontal filtering

2DHV filter for
vertical filtering

SYSTEM AND METHOD FOR MOTION COMPENSATION IN VIDEO CODING

CROSS-REFERENCE TO RELATED APPLICATION(S) AND CLAIM OF PRIORITY

The present application is related to U.S. Provisional Patent Application No. 62/018,296, filed Jun. 27, 2014, entitled "METHODS FOR MOTION COMPENSATION IN VIDEO CODING" and U.S. Provisional Patent Application No. 62/080,068, filed Nov. 14, 2014, entitled "METHODS FOR MOTION COMPENSATION IN VIDEO CODING." Provisional Patent Applications Nos. 62/018,296 and 62/080,068 are assigned to the assignee of the present application and are hereby incorporated by reference into the present application as if fully set forth herein. The present application hereby claims priority under 35 U.S.C. § 119(e) to U.S. Provisional Patent Applications Nos. 62/018,296 and 62/080,068.

TECHNICAL FIELD

The present application relates generally to video coding and, more specifically, to motion compensation in video coding.

BACKGROUND

Motion compensation is an algorithmic technique used to predict a frame in a video, given the previous and/or future frames by accounting for motion of the camera and/or objects in the video. It is employed in the encoding of video data for video compression, for example in the generation of MPEG-2 files. Motion compensation describes a picture in terms of the transformation of a reference picture to the current picture. The reference picture may be previous in time or even from the future. When images can be accurately synthesized from previously transmitted/stored images, the compression efficiency can be improved.

Motion compensation is an important block in video codecs such as HEVC and H.264/AVC and provides the most compression gains in a codec. Motion compensation compresses video by removing temporal redundancy in the video. In the block-based version of motion compensation, a block in the current picture is predicted from a displaced block in previously coded pictures. A motion vector (mvx, mvy) signals the displacement, where mvx is the displacement along the horizontal direction and mvy is the displacement along the vertical direction. Since the object in the video can undergo fractional pixel (pel) motion, sample interpolation is needed to determine the predicted block from previously coded picture. Sample interpolation is done using interpolation filters. The interpolation filter controls the quality of the interpolated samples and hence the compression efficiency.

SUMMARY

A user equipment is provided for decoding a bitstream of video. The user equipment includes a transceiver and a decoder. The transceiver is configured to receive an encoded bitstream of video including a pixel block. The decoder includes processing circuitry configured to select, from among a plurality of vertical interpolation filters, one of a vertical one-dimensional filter and a vertical two-dimensional filter. The processing circuitry is also configured to select, from among a plurality of horizontal interpolation filters, one of a horizontal one-dimensional filter and a horizontal two-dimensional filter. The processing circuitry is also configured to use the selected vertical and horizontal interpolation filters to generate at least one pixel value by interpolating pixels of the pixel block. The processing circuitry is also configured to perform prediction decoding using the at least one pixel value to restore the video.

A user equipment is provided for encoding a bitstream of video. The user equipment includes a transceiver and an encoder. The encoder includes processing circuitry configured to select, from among a plurality of vertical interpolation filters, one of a vertical one-dimensional filter and a vertical two-dimensional filter, select, from among a plurality of horizontal interpolation filters, one of a horizontal one-dimensional filter and a horizontal two-dimensional filter, use the selected vertical and horizontal interpolation filters to generate at least one pixel value by interpolating pixels of a pixel block, and perform prediction encoding using the at least one pixel value to generate an encoded bitstream of video; and a transceiver configured to send the encoded bitstream of video.

A method is provided for decoding an encoded bitstream of video. The method includes receiving the encoded bitstream of video including a pixel block. The method also includes selecting, from among a plurality of vertical interpolation filters, one of a vertical one-dimensional filter and a vertical two-dimensional filter. The method also includes selecting, from among a plurality of horizontal interpolation filters, one of a horizontal one-dimensional filter and a horizontal two-dimensional filter. The method also includes using the selected vertical and horizontal interpolation filters to generate at least one pixel value by interpolating pixels of the pixel block. The method also includes performing prediction decoding using the at least one pixel value to restore the video.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates fractional sample positions with quarter sample accuracy according to embodiments of this disclosure;

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

This disclosure describes various embodiments for motion compensation in video coding. Motion compensation interpolation filters and methods are disclosed for determining when to apply the different types of motion compensation interpolation filters.

Figure 1:
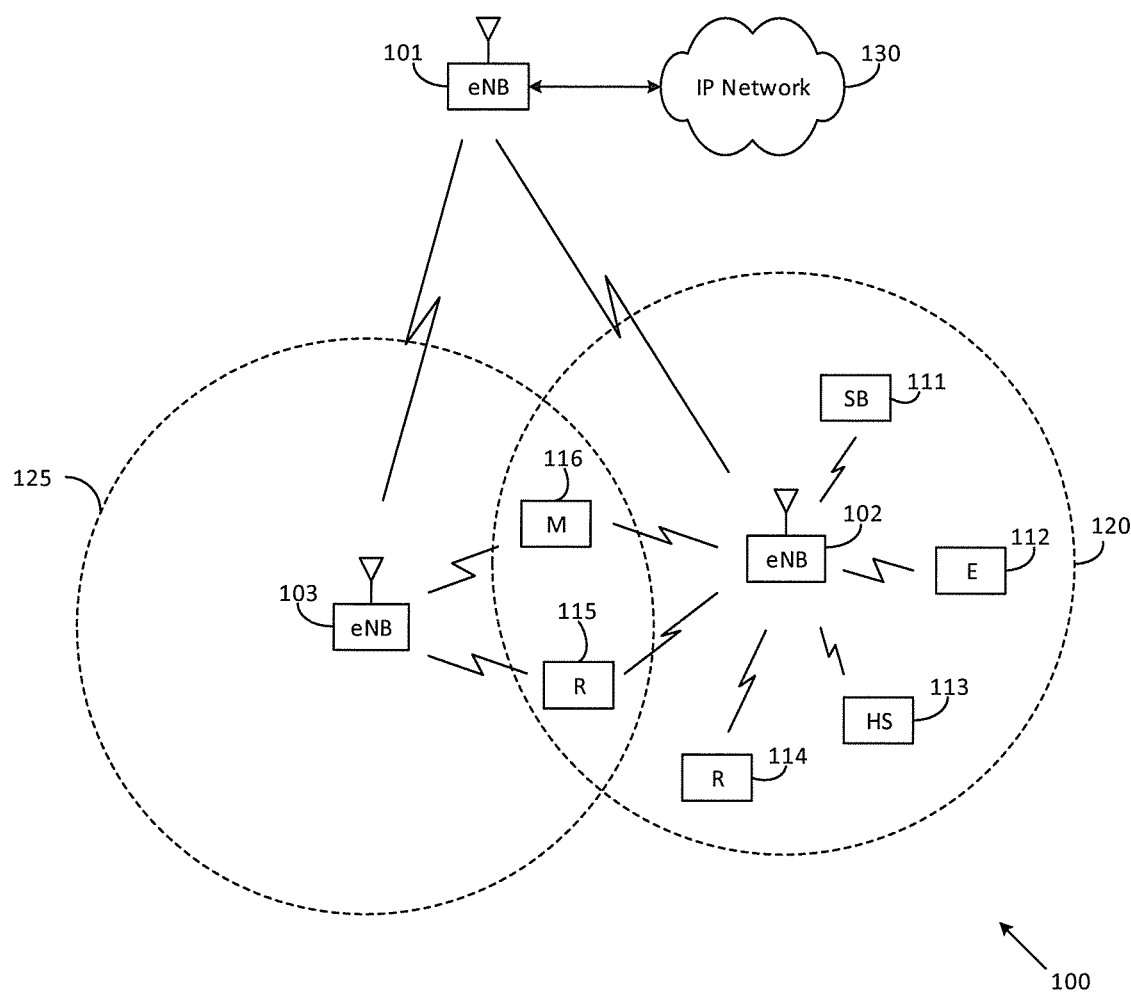
FIG. 1 illustrates an example wireless network according to this disclosure.

One or more embodiments of this disclosure recognize and take into account that the H.265/High Efficiency Video Coding (HEVC) uses 1D filters for motion compensation interpolation (e.g. 8-tap filter for luma motion compensation interpolation). The motion compensation filters are applied separately in the horizontal and vertical directions. They are applied uniformly to both uni-predicted and bi-predicted blocks, to all block sizes, to block predicted from reference picture list 0 and list 1, to block coded using any quantization parameter FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, insert general description of at least one aspect of disclosure Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
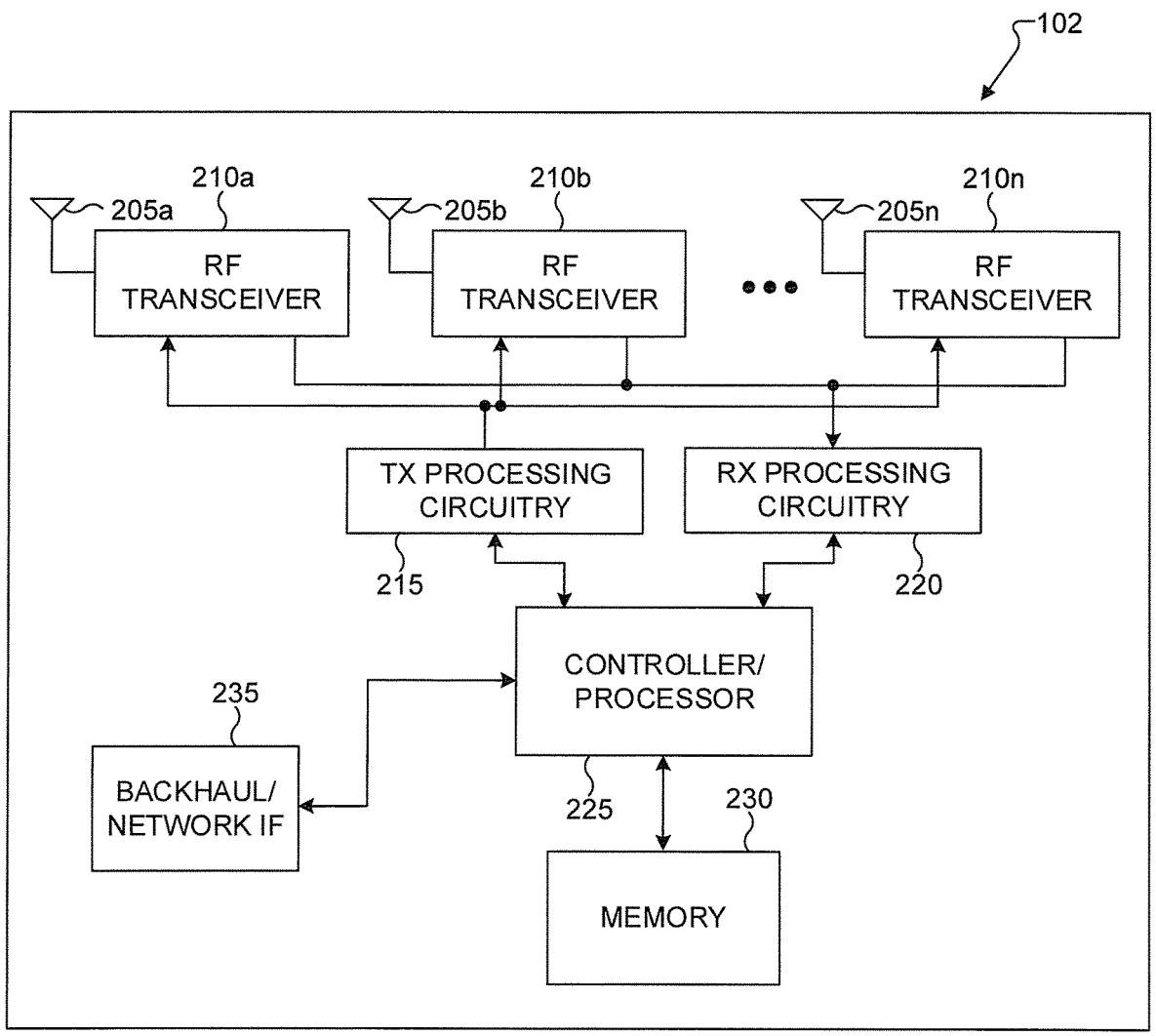
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, insert general description of at least one aspect of disclosure Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
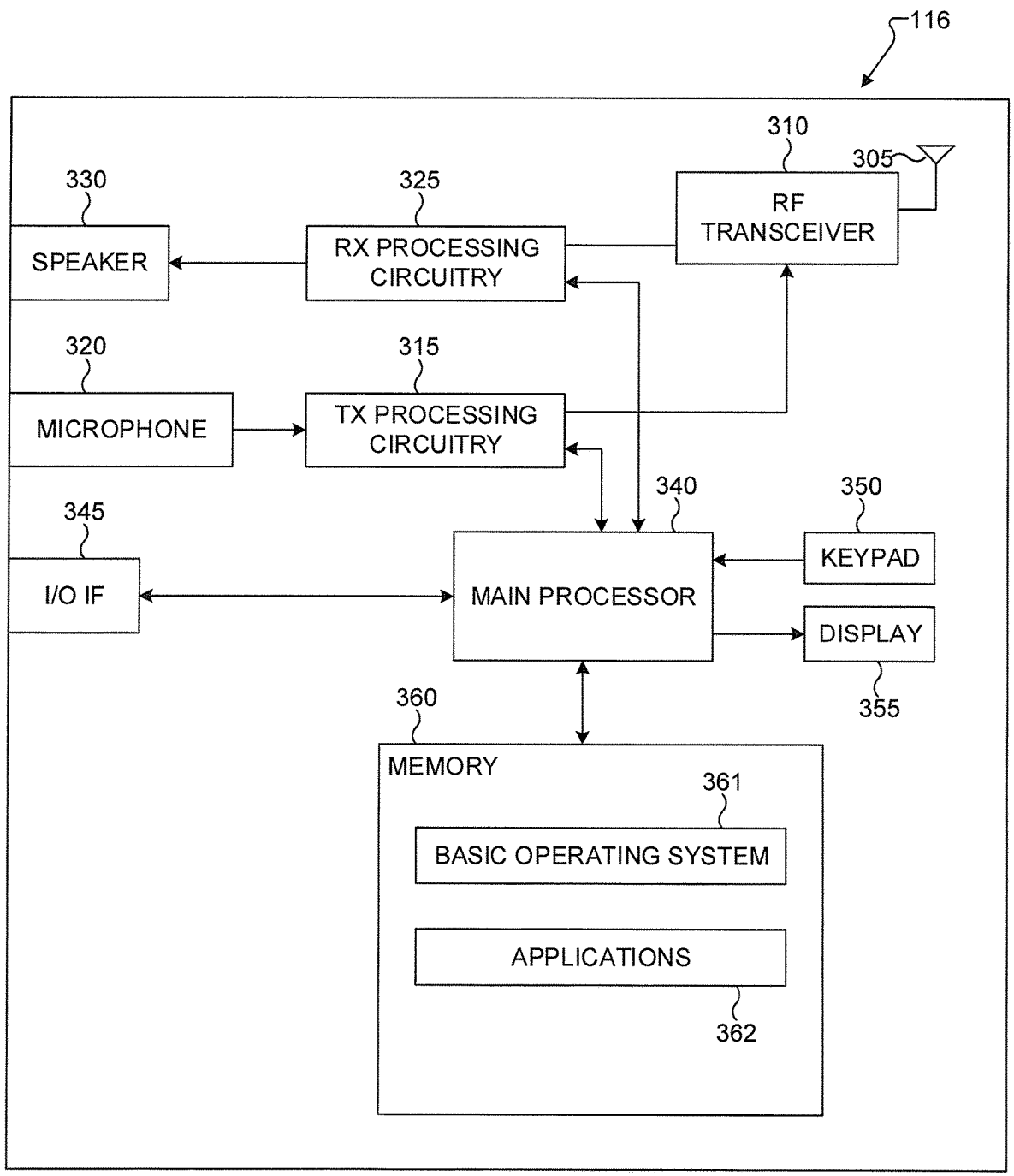
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

As described in more detail below, insert general description of at least one aspect of disclosure Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
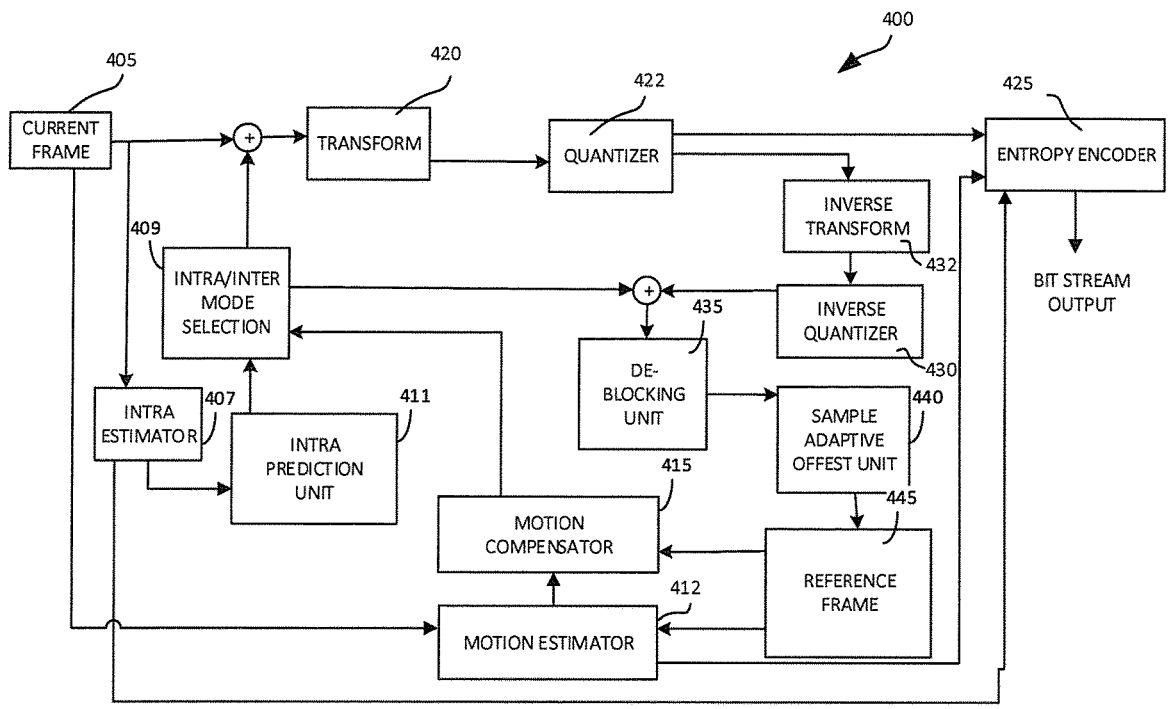
FIG. 4A illustrates an example video encoder according to embodiments of the disclosure.

FIG. 4A illustrates an example video encoder 400 according to embodiments of the present disclosure. The embodiment of the encoder 400 shown in FIG. 4A is for illustration only. Other embodiments of the encoder 400 could be used without departing from the scope of this disclosure.

As shown in FIG. 4A, the encoder 400 can be based on a coding unit. A intra estimator 407 and intra-prediction unit 411 can perform intra prediction on prediction units of the intra mode in a current frame 405. A motion estimator 412 and a motion compensator 415 can perform inter prediction and motion compensation, respectively, on prediction units of the inter-prediction mode using the current frame 405 and a reference frame 445. The intra/inter mode selection unit 409 can select between the intra-prediction unit 411 and motion compensator 415. Residual values can be generated based on the prediction units output from the intra estimator 407, intra-prediction unit 411, the motion estimator 412, and the motion compensator 415. The generated residual values can be output as quantized transform coefficients by passing through a transform unit 420 and a quantizer 422.

The quantized transform coefficients can be restored to residual values by passing through an inverse quantizer 430 and an inverse transform unit 432. The restored residual values can be post-processed by passing through a de-blocking unit 435 and a sample adaptive offset unit 440 and output as the reference frame 445. The quantized transform coefficients can be output as a bitstream 427 by passing through an entropy encoder 425.

Figure 4B:
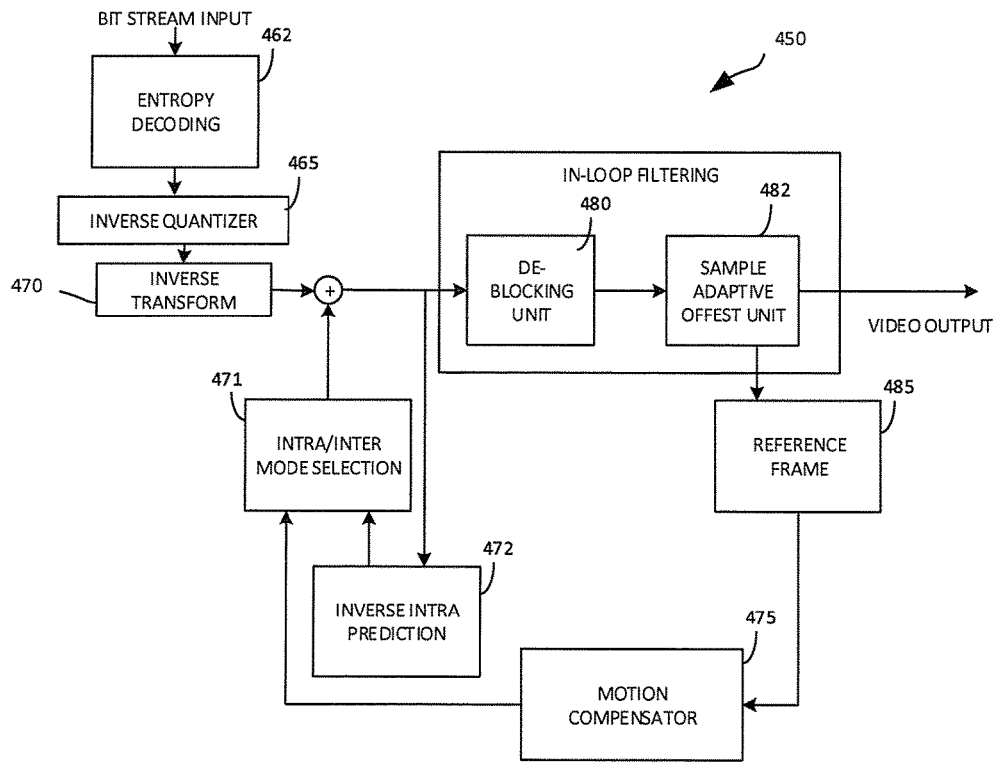
FIG. 4B illustrates an example video decoder according to embodiments of the disclosure.

FIG. 4B illustrates an example video decoder 450 according to embodiments of the present disclosure. The embodiment of the decoder 450 shown in FIG. 4B is for illustration only. Other embodiments of the decoder 450 could be used without departing from the scope of this disclosure.

As shown in FIG. 4B, the decoder 450 can be based on a coding unit. A bitstream with encoded image data can be output as inverse-quantized data by passing through an entropy decoder 462 and an inverse quantizer 465 and restored to residual values by passing through an inverse transform unit 470. The residual values can be restored according to rectangular block coding units by being added to an intra-prediction result of an intra-prediction unit 472 or a motion compensation result of a motion compensator 475. The intra/inter mode selection unit 473 can select between the intra-prediction unit 472 and motion compensator 475. The restored coding units can be used for prediction of next coding units or a next frame by passing through a de-blocking unit 480 and a sample adaptive offset unit 482. To perform decoding, components of the image decoder 450 (such as the entropy decoder 462, the inverse quantizer 465, the inverse transform unit 470, the intra prediction unit 472, the motion compensator 475, the de-blocking unit 480, and the sample adaptive offset unit 482) can perform an image decoding process.

Each functional aspect of the encoder 400 and decoder 450 will now be described.

Intra-Prediction (units 411 and 472): Intra-prediction utilizes spatial correlation in each frame to reduce the amount of transmission data necessary to represent a picture. Intra-frame is essentially the random access point. The first frame is an Intra-frame and additional frames can be Intra-frames as well to provide random access capability—e.g rewind and fast forward. Additionally, there can be some intra blocks in an inter frame. Intra-prediction is associated with making predictions within a frame, whereas inter-prediction relates to making predictions between frames.

Motion Estimation (unit 412): A concept in video compression is to store only incremental changes between frames when inter-prediction is performed. The differences between blocks in two frames can be extracted by a motion estimation tool. Here, the current block to be coded is reduced to a set of motion vectors and inter-prediction residues.

Motion Compensation (units 415 and 475): Motion compensation can be used to decode an image that is encoded by motion estimation. This reconstruction of an image is performed from received motion vectors and a block in a reference frame.

Transform/Inverse Transform (units 420, 432, and 470): A transform unit can be used to compress an image in inter-frames or intra-frames. One commonly used transform is the Discrete Cosine Transform (DCT).

Quantization/Inverse Quantization (units 422, 430, and 465): A quantization stage can reduce the amount of information by dividing each transform coefficient by a particular number to reduce the quantity of possible values that each transform coefficient value could have. Because this makes the values fall into a narrower range, this allows entropy coding to express the values more compactly.

De-blocking and Sample adaptive offset units (units 435, 440, and 482): De-blocking can remove encoding artifacts due to block-by-block coding of an image. A de-blocking filter acts on boundaries of image blocks and removes blocking artifacts. A sample adaptive offset unit can minimize ringing artifacts.

In FIGS. 4A and 4B, portions of the encoder 400 and the decoder 450 are illustrated as separate units. However, this disclosure is not limited to the illustrated embodiments. Also, as shown here, the encoder 400 and decoder 450 include several common components. In some embodiments, the encoder 400 and the decoder 450 may be implemented as an integrated unit, and one or more components of an encoder may be used for decoding (or vice versa). Furthermore, each component in the encoder 400 and the decoder 450 could be implemented using any suitable hardware or combination of hardware and software/firmware instructions, and multiple components could be implemented as an integral unit. For instance, one or more components of the encoder 400 or the decoder 450 could be implemented in one or more field programmable gate arrays (FPGAs), application specific integrated circuits (ASICs), microprocessors, microcontrollers, digital signal processors, or a combination thereof.

Figure 5A:
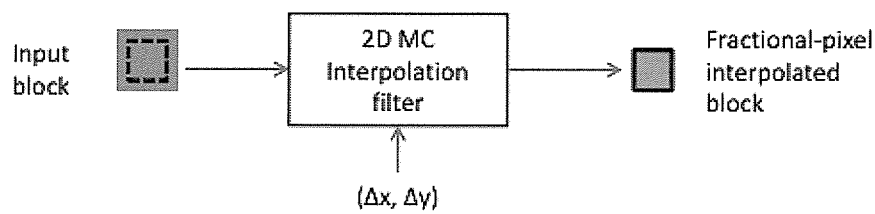
FIGS. 5A-5C illustrate a high level comparison of motion compensation interpolation filtering according to embodiments of this disclosure.
Figure 5B:
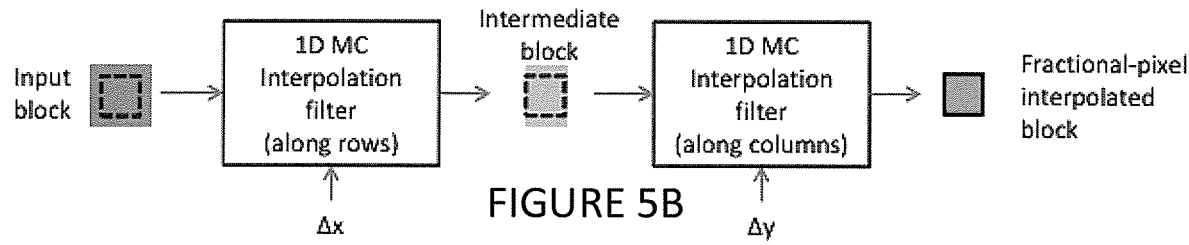
Figure 5C:
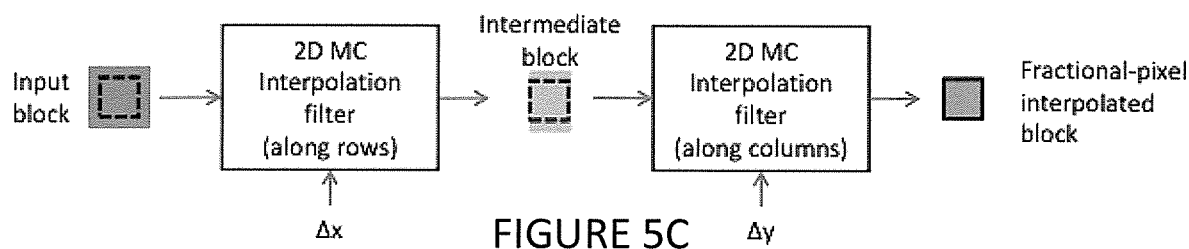

FIGS. 5A-5C illustrate a high level comparison of motion compensation interpolation filtering according to embodiments of this disclosure. In FIGS. 5A-5C, $\Delta x$ denotes the fractional part of x-component of motion vector and $\Delta y$ denotes the fractional part of y-component of motion vector. When $\Delta x$ is 0, interpolation along the horizontal direction is skipped and when $\Delta y$ is 0, interpolation along the vertical direction is skipped. FIG. 5A illustrates a 2D non-separable motion compensation interpolation filter. FIG. 5A illustrates a 2D separable motion compensation filter implemented with 1D filtering along rows followed by along columns (or vice versa).

FIG. 5C illustrates a 2D separable motion compensation filter with 2D filtering along rows followed by columns (or vice versa). One or more embodiments of this disclosure provide two dimensional (2D) horizontal and vertical (2DHV) interpolation filters instead of one dimensional (1D) horizontal and vertical interpolation filters traditionally used for motion compensation interpolation in video coding standards such as high efficiency video coding (HEVC). Note that the approach adopted in video coding standards such as HEVC is a 2D interpolation filter that is split into two 1D filters applied in the horizontal and vertical directions, such as in FIG. 5B. This disclosure provides a 2D separable interpolation filter split into two 2D filters applied in the horizontal and vertical directions. In different systems, 2D non-separable interpolation filters are proposed. A 2D non-separable interpolation filter is directly applied on the image in a non-separable fashion (i.e. no two-pass filtering using cascaded horizontal and vertical filters).

Various embodiments of this disclosure provide different types of interpolation filters depending on whether the block is uni-predicted or bi-predicted. The different types of interpolation filters depend on a flag that is signaled at a block level, where the block can be a coding unit, prediction unit, slice, tile, picture, and the like. The 2DHV filters in this disclosure are designed in a unique way to have phase shift property needed for fractional-pel interpolation. The horizontal and vertical interpolation filters can be different 2D filters. One of the filters could be 2D and the other could be 1D. The actual filter coefficients used for the horizontal and vertical 2D and 1D interpolation filters can be different than the example filters presented in this disclosure. The methods presented in this disclosure can be applied to any arbitrary fractional-pel sample location (e.g. ¼-pel, ⅛-pel).

This disclosure is not limited to the illustrated embodiments. The methods and systems presented in this disclosure are not limited to luma channel and can be applied to any color channel or depth channel. The methods in this disclosure have been described using horizontal filtering first following by vertical filtering, but can be applied to vertical filtering first followed by horizontal filtering. Different interpolation filters can also be selectively applied based on the reference picture list. For example, in HEVC, reference picture list 0 could use different interpolation filters when compared to reference picture list 1. Different interpolation filters can also be selectively applied based on motion compensation block size, depending on the depth of the picture in the hierarchical coding structure such as hierarchical-B and hierarchical-P coding structures, and/or depending on the quantization parameter used for the block. The interpolation filters described in this disclosure are not limited in application to motion compensation filtering alone and can be used for upsampling/downsampling images, such as in scalable video coding.

Various embodiments of this disclosure provide 2D horizontal and vertical interpolation (2DHV) filters instead of 1D horizontal and vertical interpolation filters used in HEVC. The various embodiments of this disclosure provide bit-rate savings because 2D filters provide more flexibility in controlling the quality of the interpolation. An example 2D filter used in this disclosure for half-sample interpolation is h=[8 8;16 16;8 8]. In combination with CU-level switching, the 2D filter provides 6.7% bitrate savings for 8K sequences under LDP test conditions over HEVC. The various embodiments of this disclosure provide complexity reduction due to the additional degree of freedom (i.e. the second dimension), the 2D filter can be designed to have lower complexity. For example, for the 2D interpolation filter h=[8 8;16 16;8 8] used in this disclosure, the implementation complexity is 5 additions. In comparison a HEVC half-sample 8-tap interpolation filter (h=[−1, 4, −11, 40, 40, −11, 4, −1]) uses 11 additions.

Various embodiments of this disclosure provide selective application of different interpolation filters depending on whether the block is uni-predicted or bi-predicted. The various embodiments of this disclosure provide that bi-predicted blocks have an implicit smoothing effect built into them because of the averaging from two blocks, while uni-predicted blocks do not have an implicit smoothing effect. Using different types of interpolation filters depending on whether the block is uni-predicted or bi-predicted can provide additional compression gains. For example, a uni-predicted block could use an interpolation filter that is a smoother low-pass filter compared to the interpolation filter for bi-predicted blocks.

Various embodiments of this disclosure provide CU-level switching of 2DHV and 1D interpolation filters. CU-level switching allows for switching the filter type based on local block characteristics independent of whether the block is uni-predicted or bi-predicted.

FIG. 6 illustrates fractional sample positions with quarter sample accuracy according to embodiments of this disclosure. An embodiment of this disclosure provides integer sample positions (blocks with upper-case letters) and fractional sample positions (blocks with lower-case letters) for quarter sample luma interpolation. Block 602 is one example of an integer sample position and block 604 is one example of a fractional sample position.

In FIG. 6, The $A_{x,y}$ blocks denote the integer samples of the input block. The $b_{x,y}$, $h_{x,y}$, $j_{x,y}$ blocks denote the samples at half-pel positions that are to be calculated by interpolation. The ax,y, cx,y, dx,y, ex,y, fx,y, gx,y, ix,y, kx,y, nx,y, px,y, qx,y, rx,y blocks denote the samples at quarter-pel positions that are to be calculated by interpolation.

Figure 7:
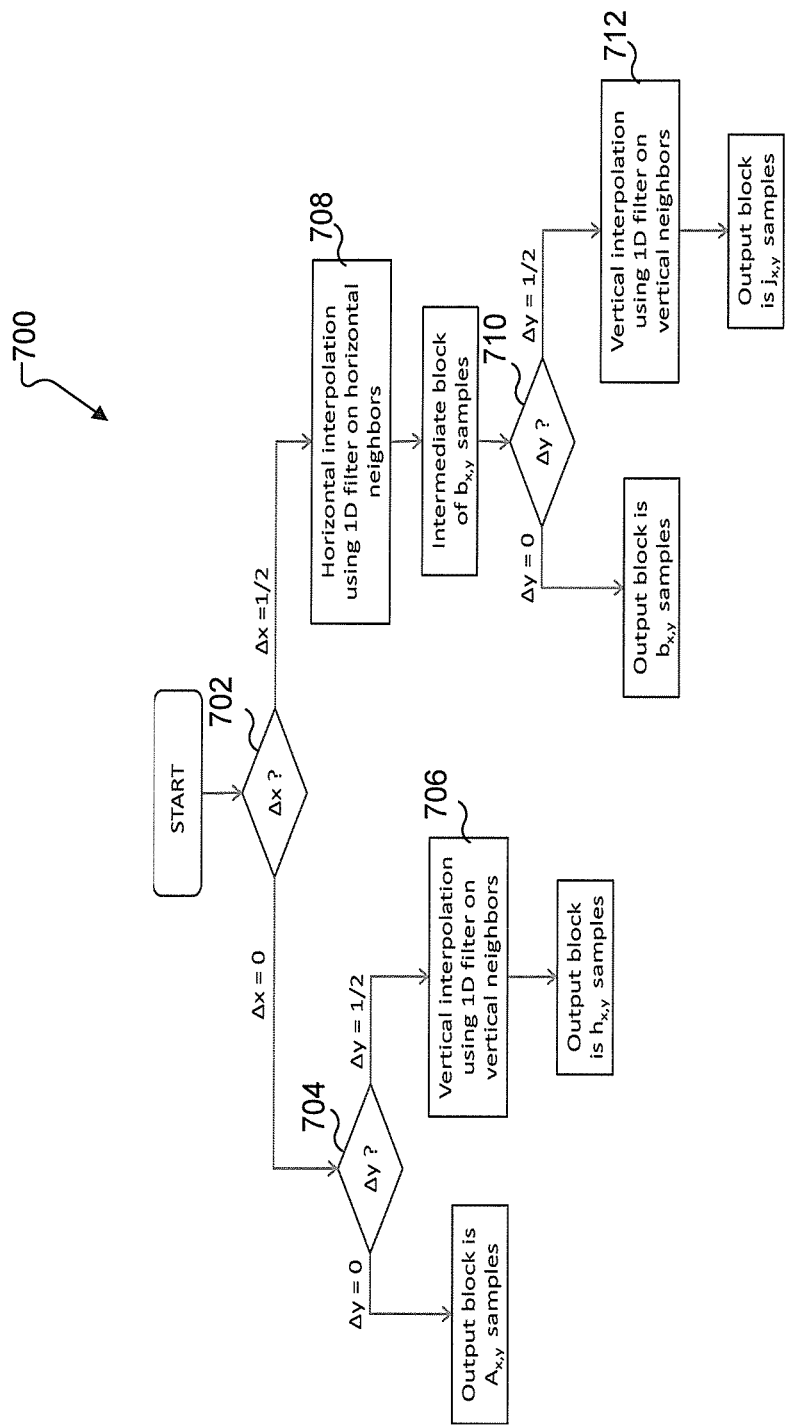
FIG. 7 illustrates a process of fractional-pel interpolation in HEVC using half-pel positions according to this disclosure.

FIG. 7 illustrates a process 700 of fractional-pel interpolation in HEVC using half-pel positions according to embodiments of this disclosure. In FIG. 7, horizontal and/or vertical interpolation is performed depending on the values of Δx and Δy. Horizontal interpolation is carried out by using a 1D filter on horizontal neighboring samples. Vertical interpolation is carried out by using a 1D filter on vertical neighboring samples.

At operation 702, a controller identifies Δx. When Δx=0, at operation 704, the controller identifies Δy. When Δy=0, no interpolation is done and the sample position is Δx,y. At operation 704, when Δy=½, only vertical interpolation is performed at operation 706 by a 8-tap filter using 8 vertical neighbors for sample position h0,0.

At operation 702, when Δx=½, the controller performs horizontal interpolation at operation 708 by a 8-tap filter using 8 horizontal neighbors for sample position b0,0. At operation 710, the controller identifies Δy. When Δy=0, the controller only performs the horizontal interpolation at operation 708 and the sample position is bx,y. When and Δy=½, the controller performs both horizontal and vertical interpolation. Horizontal interpolation is used to calculated intermediate samples bx,y which are then vertically interpolated to calculate the final samples jx,y.

Figure 8A:
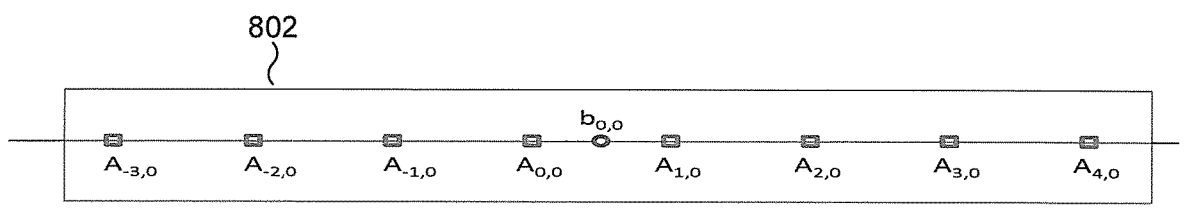
FIGS. 8A and 8B illustrate samples used for half-pel interpolation along a horizontal direction according to embodiments of this disclosure.
Figure 8B:
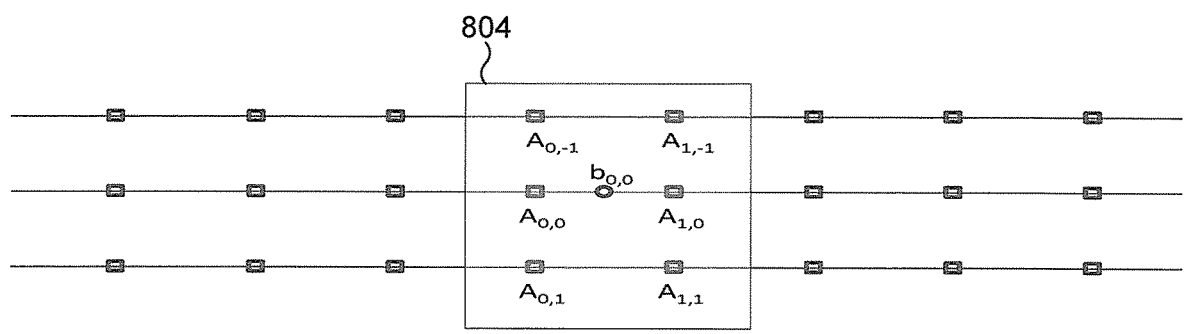

FIGS. 8A and 8B illustrate samples used for half-pet interpolation along a horizontal direction according to embodiments of this disclosure. In FIG. 8A, HEVC uses horizontal neighboring samples 802 for horizontal interpolation. In FIG. 8B, one or more embodiments of this disclosure use both horizontal and vertical neighboring samples for horizontal interpolation. In one example embodiment, a 3×2 neighborhood 804 is used; an M×N neighborhood or an irregular shaped region could also be used.

Figure 9A:
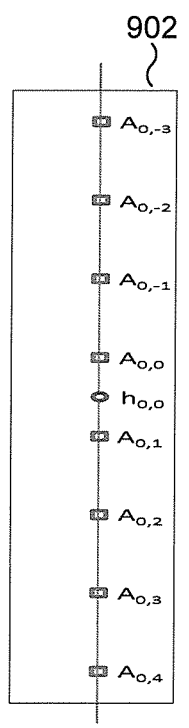
FIGS. 9A and 9B illustrate samples used for half-pel interpolation along a vertical direction.
Figure 9B:
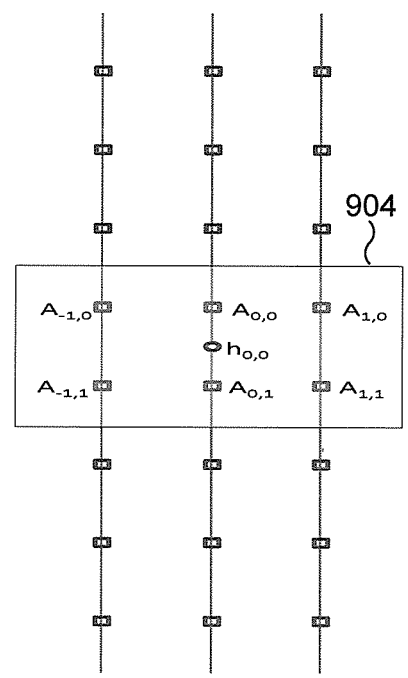

FIGS. 9A and 9B illustrate samples used for half-pel interpolation along a vertical direction. In FIG. 9A, HEVC uses vertical neighboring samples 902 for vertical interpolation. In FIG. 9B, one or more embodiments of this disclosure use both horizontal and vertical neighboring samples for vertical interpolation. In one example embodiment, a 2×3 neighborhood 904 is used; an M×N neighborhood or an irregular shaped region could also be used.

Figure 10:
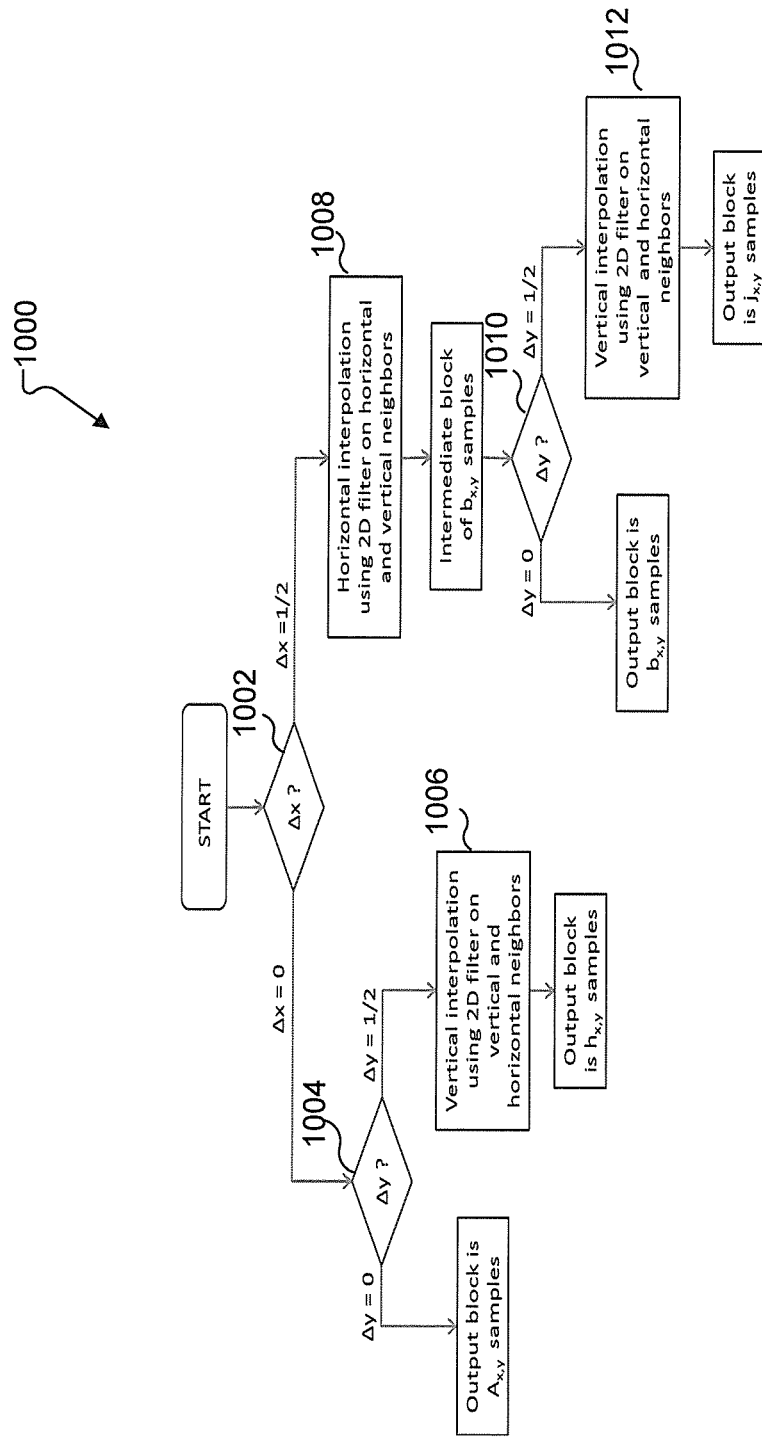
FIG. 10 illustrates a process of fractional-pel interpolation using half-pel positions in accordance with an embodiment of this disclosure.

FIG. 10 illustrates a process 1000 of fractional-pel interpolation using half-pet positions in accordance with an embodiment of this disclosure. In FIG. 10, horizontal and/or vertical interpolation is performed depending on the values of Δx and Δy. Horizontal interpolation is carried out by using a 2D filter on an M×N neighborhood. Vertical interpolation is carried out by using a 2D filter on an M×N neighborhood. In different embodiments, the M×N neighborhood for horizontal interpolation can be different than the M×N neighborhood used with vertical interpolation.

At operation 1002, a controller identifies Δx. When Δx=0, at operation 1004, the controller identifies Δy. When Δy=0, no interpolation is done and the sample position is Δx,y. At operation 1004, when Δy=½, only vertical interpolation is performed at operation 1006 using both horizontal and vertical neighbors for sample position h0,0.

At operation 1002, when Δx=½, the controller performs horizontal interpolation at operation 708 using both horizontal and vertical neighbors for sample position b0,0. At operation 1010, the controller identifies Δy. When Δy=0, the controller only performs the horizontal interpolation at operation 708 and the sample position is bx,y. When and Δy=½, the controller performs both horizontal and vertical interpolation. Horizontal interpolation is used to calculated intermediate samples bx,y which are then vertically interpolated to calculate the final samples jx,y. Horizontal and vertical samples are used in both horizontal and vertical interpolation in contrast to HEVC.

Figure 11A:
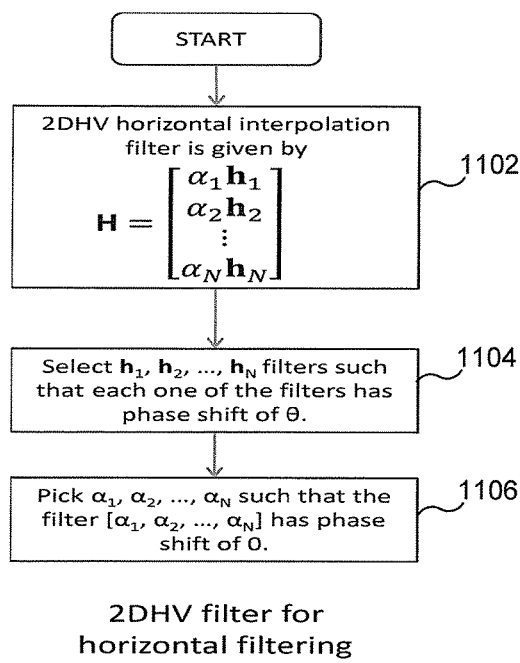
FIGS. 11A and 11B illustrate processes for 2DHV filter design half-pel interpolation according to embodiments of this disclosure.
Figure 11B:
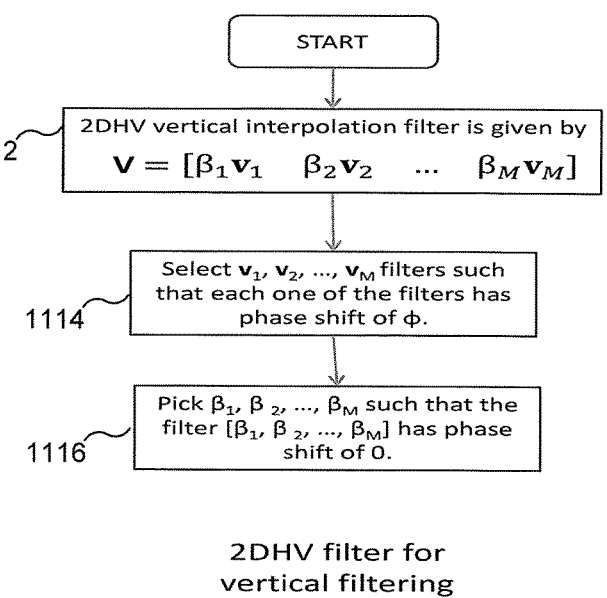

FIGS. 11A and 11B illustrate processes for 2DHV filter design half-pel interpolation according to embodiments of this disclosure. Horizontal interpolation is carried out by using a 2D filter on horizontal and vertical neighboring samples. Vertical interpolation is carried out by using a 2D filter on horizontal and vertical neighboring samples. In one or more example embodiments, the 2DHV filters are of size M×N (M columns and N rows). Some of the filter coefficients have a phase shift of 0. The 2DHV filters have very specific phase properties to match the phase shift used by fractional-pel interpolation.

In FIG. 11A, the phase shift properties are described using the horizontal interpolation filter as an example. For a 2DHV filter for horizontal interpolation with phase shift θ (θ=0.5 for half-pixel interpolation, θ=0.25 or 0.75 for quarter pixel interpolation), the 2DHV filter for horizontal interpolation can be defined as follows:

$$H = \begin{bmatrix} \alpha_1 h_1 \\ \alpha_2 h_2 \\ \vdots \\ \alpha_N h_N \end{bmatrix},$$

where α1, α2, . . . , αN are scalar values and h1, h2, . . . , hN are 1D filters of at most length N. The 1D filters h1, h2, . . . , hN are designed to have phase shift of θ. The 1D filter defined by [α1, α2, . . . , αN] is designed to have phase shift of 0. In this example embodiment, the overall 2DHV filter used for horizontal interpolation will have phase shift θ along the horizontal direction and phase shift 0 along the vertical direction thereby satisfying the fractional-pel phase shift requirements.

In FIG. 11A, a design process is used for designing 2DHV vertical interpolation filter with phase shift φ along vertical direction and 0 along horizontal direction to satisfy fractional-pel phase shift requirements. For a 2DHV filter for vertical interpolation with phase shift φ (φ=0.5 for half-pixel interpolation, φ=0.25 or 0.75 for quarter pixel interpolation), the 2DHV filter for vertical interpolation can be defined as follows:

$$V = \beta_1 v_1 \beta_2 v_2 \ldots \beta_M v_M,$$

where β1, β2, . . . , βM are scalar values and v1, v2, . . . , vN are 1D filters of at most length M. The 1D filters v1, v2, . . . , vN are designed to have phase shift of φ. The 1D filter defined by [β1, β2, . . . , βM] is designed to have phase shift of 0. In this example embodiment, the overall 2DHV filter used for vertical interpolation will have phase shift φ along the vertical direction and phase shift 0 along the horizontal direction thereby satisfying the fractional-pet phase shift requirements.

One example 2D filter developed for half-pel horizontal filtering based on the designs in FIGS. 11A and 11B is:

$$h = \begin{bmatrix} 8 & 8 \\ 16 & 16 \\ 8 & 8 \end{bmatrix} \Big/ 64.$$

The filtering operation using the above filter would be:

$$b_{0,0}=(8A_{0,-1}+8A_{1,-1}+16A_{0,0}+16A_{1,0}+8A_{0,1}+8A_{1,1}+32)/64$$

The multiplications by 8 and 16 can be implemented by left shifts. The division by 64 can be implemented by a right shift.

$$h = \begin{bmatrix} & 8 & 8 & \\ -2 & 18 & 18 & -2 \\ & 8 & 8 & \end{bmatrix} / 64.$$

The filtering operation using the above filter would be:

$$b_{0,0}=(8A_{0,-1}+8A_{1,-1}-2A_{-1,0}+18A_{0,0}+18A_{1,0}-2A_{2,0}+8A_{0,1}+8A_{1,1}+32)/64.$$

The filters used for vertical filtering are the corresponding transposes. The filtering equations are also correspondingly modified.

An example filter of quarter-pel (0.25) interpolation filter is given below:

$$h = \begin{bmatrix} -2 & 27 & 8 & -1 \\ -4 & 54 & 16 & -2 \\ -2 & 27 & 8 & -1 \end{bmatrix} / 128.$$

Figure 12:
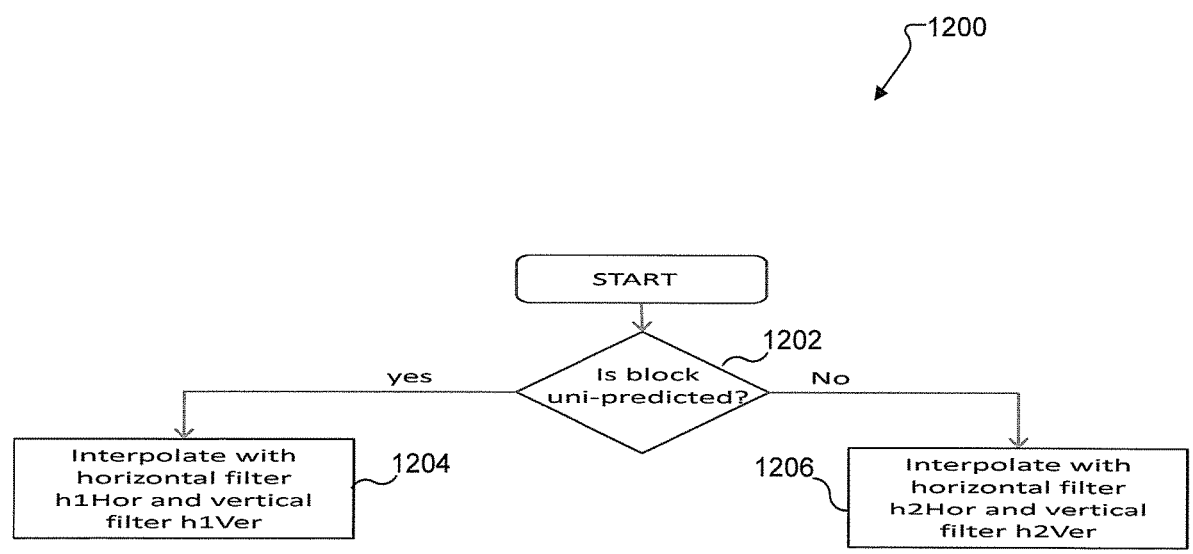
FIG. 12 illustrates a process for applying different interpolation filters depending on whether the block is uni-predicted or bi-predicted according to an embodiment of this disclosure.

FIG. 12 illustrates a process 1200 for applying different interpolation filters depending on whether the block is uni-predicted or bi-predicted according to an embodiment of this disclosure. In an embodiment of this disclosure, bi-predicted blocks have an implicit smoothing effect built into them because of the averaging from two blocks. Using different types of interpolation filters depending on whether the block is uni-predicted or bi-predicted can provide additional compression gain. For example, uni-predicted block could use an interpolation filter which is a smoother low-pass filter when compared to the interpolation filter for bi-predicted blocks.

In FIG. 12, at operation 1202, a controller determines whether a block is uni-predicted. If the block is uni-predicted, at operation 1204, horizontal interpolation filter h1Hor and vertical interpolation filter h1Ver are used. If the block is bi-predicted, at operation 1206, h2Hor and h2Ver are used respectively. In one example embodiment, Hor, h1Ver, h2Hor, and h2Ver filters used for generating half-pel sample results are:

$$h1Hor = \begin{bmatrix} 8 & 8 \\ 16 & 16 \\ 8 & 8 \end{bmatrix} / 64,$$

where h1Ver=transpose(h1Hor), h2Hor=[−1, 4, −11, 40, 40, −11, 4, −1]/64 (HEVC 8-tap filter), and h2Ver=transpose (h2Ver). The above filters are example filters. Other filter combinations can be used. In different embodiments, process 1200 can be applied to other fractional-pel sample locations.

Figure 13:
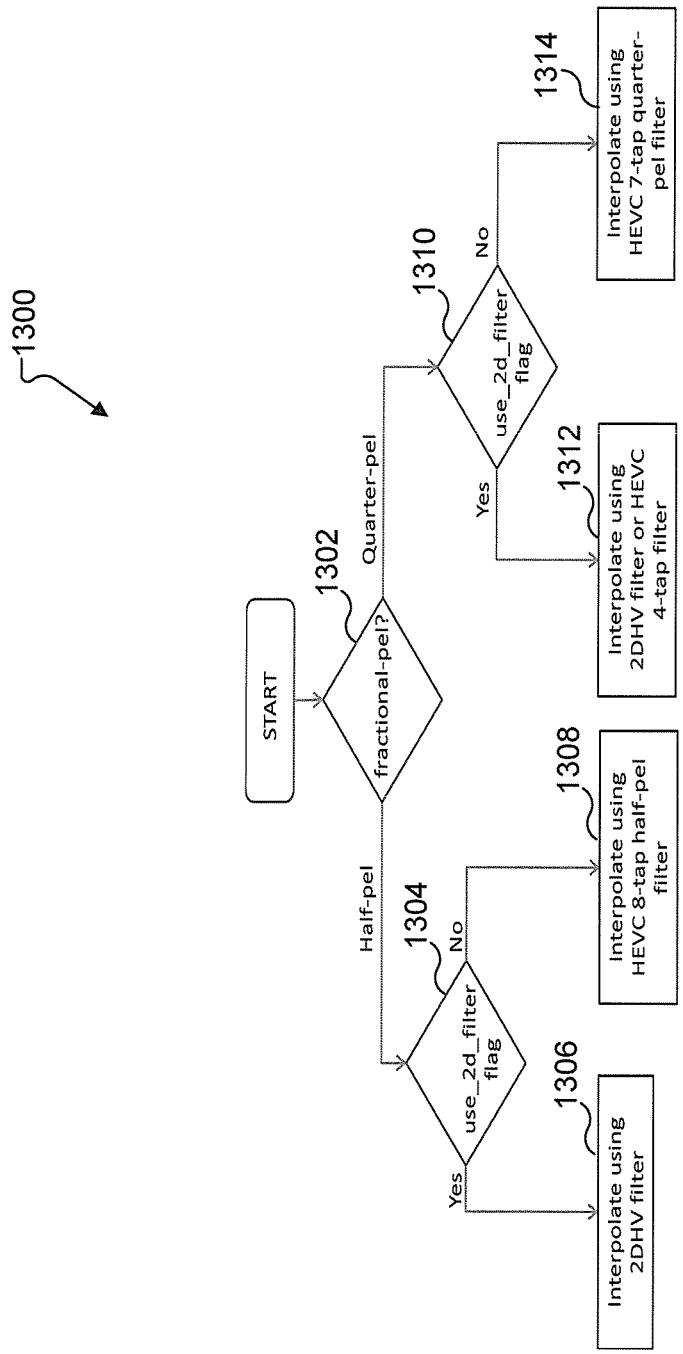
FIG. 13 illustrates a process of using a CU-level flag to signal the use of 2DHV filters according to an embodiment of this disclosure.

FIG. 13 illustrates a process 1300 of using a CU-level flag to signal the use of 2DHV filters according to an embodiment of this disclosure. In FIG. 13, for half-pixel interpolation, depending on the flag, either the 2DHV filter or the HEVC 8-tap filter is used. For quarter-pixel interpolation, depending on the flag, the 2DHV filter (or alternately HEVC 4-tap filter) or HEVC 7-tap filter is used.

At operation 1302, a controller determines whether half-pixel or quarter-pixel interpolation is used. If half-pixel interpolation is used, at operation 1304, the controller determines whether a flag indicates to use a 2D filter. If the flag indicates a 2D filter, at operation 1306, the controller interpolates using a 2DHV filter. If the flag indicates not to use a 2D filter, then at operation 1308, the controller interpolates using an HEVC 8-tap half-pel filter.

If quarter-pixel interpolation is used at operation 1302, then the controller at operation 1310 determines whether a flag indicates to use a 2D filter. If the flag indicates a 2D filter, at operation 1312, the controller interpolates using a 2DHV filter or HEVC 4-tap filter. If the flag indicates not to use a 2D filter, then at operation 1314, the controller interpolates using an HEVC 7-tap quarter-pel filter.

As used herein, different processes and method are referred to as being executed by a controller. However, any of these processes or methods can be executed by a number of components disclosed herein, such as, for example, a processor or processing circuitry.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment, comprising:
   a transceiver configured to receive an encoded bitstream of video including a pixel block; and
   a decoder comprising processing circuitry configured to:
      utilize two-dimensional separable interpolation filters, each two-dimensional separable split into two two-dimensional filters applied in horizontal and vertical directions,
      select, from among a plurality of vertical interpolation filters, one of a vertical one-dimensional filter or a vertical two-dimensional filter,
      select, from among a plurality of horizontal interpolation filters, one of a horizontal one-dimensional filter or a horizontal two-dimensional filter,
      use the selected vertical and horizontal interpolation filters to generate at least one pixel value by interpolating pixels of the pixel block, and
      perform prediction decoding using the at least one pixel value to restore the video,
   wherein the horizontal two-dimensional filter for horizontal interpolation is defined as:

$$H = \begin{bmatrix} \alpha_1 h_1 \\ \alpha_2 h_2 \\ \vdots \\ \alpha_N h_N \end{bmatrix},$$

where $\alpha 1, \alpha 2, \ldots, \alpha N$ are scalar values, $h1, h2, \ldots, hN$ are one-dimensional filters of at most length N, where $h1, h2, \ldots, hN$ are each selected to include a phase shift of $\theta$, and where $\alpha 1,$ 60 $2, \ldots, \alpha N$ are selected to include a phase shift of 0.

2. The user equipment of claim 1, wherein the horizontal and vertical two-dimensional filters use an M×N neighborhood of samples of the pixel block, where M is a number of columns, and where N is a number of rows.

3. The user equipment of claim 2, wherein the M×N neighborhood of samples associated with the horizontal two-dimensional filter is different from the M×N neighborhood of samples associated with the vertical two-dimensional filter.

4. The user equipment of claim 2, wherein the processing circuitry is configured to use the selected vertical and horizontal interpolation filters in succession.

5. The user equipment of claim 1, wherein the processing circuitry is further configured to:
   determine whether the pixel block is uni-predicted or bi-predicted;
   responsive to the pixel block being uni-predicted, interpolate the pixels of the pixel block using the vertical and horizontal one-dimensional filters; and
   responsive to the encoded bitstream being bi-predicted, interpolate the pixels of the pixel block using the vertical and horizontal two-dimensional filters.

6. The user equipment of claim 1, wherein the processing circuitry is further configured to:
   identify a flag indicating whether to use two-dimensional interpolation;
   select, from among the plurality of vertical interpolation filters, one of the vertical one-dimensional filter and the vertical two-dimensional filter based on the flag; and
   select, from among the plurality of horizontal interpolation filters, one of the horizontal one-dimensional filter and the horizontal two-dimensional filter based on the flag.

7. The user equipment of claim 1, wherein the vertical two-dimensional filter for vertical interpolation is defined as:

$$V = \beta_1 v_1 \beta_2 v_2 \ldots \beta_M v_M,$$

where $\beta 1, \beta 2, \ldots, \beta M$ are scalar values and $v1, v2, \ldots, vN$ are one-dimensional filters of at most length M, where $v1, v2, \ldots, vN$ are designed to have phase shift of $\varphi$, and where $\beta 1, \beta 2, \ldots, \beta M$ are selected to include a phase shift of 0.

8. A user equipment, comprising:
   an encoder comprising processing circuitry configured to:
      utilize two-dimensional separable interpolation filters, each of the two-dimensional separable interpolation filter split into two two-dimensional filters applied in horizontal and vertical directions,
      select, from among a plurality of vertical interpolation filters, one of a vertical one-dimensional filter or a vertical two-dimensional filter,
      select, from among a plurality of horizontal interpolation filters, one of a horizontal one-dimensional filter or a horizontal two-dimensional filter,
      use the selected vertical and horizontal interpolation filters to generate at least one pixel value by interpolating pixels of a pixel block, and
      perform prediction encoding using the at least one pixel value to generate an encoded bitstream of video; and
   a transceiver configured to send the encoded bitstream of video,
   wherein the horizontal two-dimensional filter for horizontal interpolation is defined as:

$$H = \begin{bmatrix} \alpha_1 h_1 \\ \alpha_2 h_2 \\ \vdots \\ \alpha_N h_N \end{bmatrix},$$

where $\alpha 1, \alpha 2, \ldots, \alpha N$ are scalar values, $h1, h2, \ldots, hN$ are one-dimensional filters of at most length N, where $h1, h2, \ldots, hN$ are each selected to include a phase shift of $\theta$, and where $\alpha 1, 60\ 2, \ldots, \alpha N$ are selected to include a phase shift of 0.

9. The user equipment of claim 8, wherein the horizontal and vertical two-dimensional filters use an M×N neighborhood of samples of the pixel block, where M is a number of columns, and where N is a number of rows.

10. The user equipment of claim 9, wherein the M×N neighborhood of samples associated with the horizontal two-dimensional filter is different from the M×N neighborhood of samples associated with the vertical two-dimensional filter.

11. The user equipment of claim 9, wherein the processing circuitry is configured to use the selected vertical and horizontal interpolation filters in succession.

12. The user equipment of claim 8, wherein the processing circuitry is further configured to:
   determine whether the pixel block is uni-predicted or bi-predicted;
   responsive to the pixel block being uni-predicted, interpolate the pixels of the pixel block using the vertical and horizontal one-dimensional filters; and
   responsive to the encoded bitstream being bi-predicted, interpolate the pixels of the pixel block using the vertical and horizontal two-dimensional filters.

13. The user equipment of claim 8, wherein the processing circuitry is further configured to:
   identify a flag indicating whether to use two-dimensional interpolation;
   select, from among the plurality of vertical interpolation filters, one of the vertical one-dimensional filter and the vertical two-dimensional filter based on the flag; and
   select, from among the plurality of horizontal interpolation filters, one of the horizontal one-dimensional filter and the horizontal two-dimensional filter based on the flag.

14. The user equipment of claim 8, wherein the vertical two-dimensional filter for vertical interpolation is defined as:

$$V = \beta_1 v_1 \beta_2 v_2 \ldots \beta_M v_M,$$

where $\beta 1, \beta 2, \ldots, \beta M$ are scalar values and $v1, v2, \ldots, vN$ are one-dimensional filters of at most length M, where $v1, v2, \ldots, vN$ are each selected to include a phase shift of $\varphi$, and where $\beta 1, \beta 2, \ldots, \beta M$ are selected to include a phase shift of 0.

15. A method for decoding an encoded bitstream of video, the method comprising:
   receiving the encoded bitstream of video including a pixel block;
   utilizing two-dimensional separable interpolation filters, each of the two-dimensional separable interpolation filters split into two two-dimensional filters applied in horizontal and vertical directions;
   selecting, from among a plurality of vertical interpolation filters, one of a vertical one-dimensional filter or a vertical two-dimensional filter;
   selecting, from among a plurality of horizontal interpolation filters, one of a horizontal one-dimensional filter or a horizontal two-dimensional filter;
   using the selected vertical and horizontal interpolation filters to generate at least one pixel value by interpolating pixels of the pixel block; and
   performing prediction decoding using the at least one pixel value to restore the video, wherein the horizontal two-dimensional filter for horizontal interpolation is defined as:

$$H = \begin{bmatrix} \alpha_1 h_1 \\ \alpha_2 h_2 \\ \vdots \\ \alpha_N h_N \end{bmatrix},$$

where $\alpha_1, \alpha_2, \ldots, \alpha_N$ are scalar values, $h_1, h_2, \ldots, h_N$ are one-dimensional filters of at most length N, where $h_1, h_2, \ldots, h_N$ are each selected to include a phase shift of $\theta$, and where $\alpha_1, \alpha_2, \ldots, \alpha_N$ are selected to include a phase shift of 0.

16. The method of claim 15, wherein the horizontal and vertical two-dimensional filters use an M×N neighborhood of samples of the pixel block, where M is a number of columns, and where N is a number of rows.

17. The method of claim 16, wherein the M×N neighborhood of samples associated with the horizontal two-dimensional filter is different from the M×N neighborhood of samples associated with the vertical two-dimensional filter.

18. The method of claim 15, further comprising:
determining whether the pixel block is uni-predicted or bi-predicted;
responsive to the pixel block being uni-predicted, interpolating the pixels of the pixel block using the vertical and horizontal one-dimensional filters; and
responsive to the encoded bitstream being bi-predicted, interpolating the pixels of the pixel block using the vertical and horizontal two-dimensional filters.

* * * * *